United States Patent
Ranasinghe et al.

[11] Patent Number: 6,065,280
[45] Date of Patent: May 23, 2000

[54] METHOD OF HEATING GAS TURBINE FUEL IN A COMBINED CYCLE POWER PLANT USING MULTI-COMPONENT FLOW MIXTURES

[75] Inventors: Jatila Ranasinghe, Niskayuna; Raub Warfield Smith, Ballston Lake, both of N.Y.

[73] Assignee: General Electric Co., Schenectady, N.Y.

[21] Appl. No.: 09/057,264

[22] Filed: Apr. 8, 1998

[51] Int. Cl.[7] .................................................... F02C 6/00
[52] U.S. Cl. ......................... 60/39.02; 60/39.181; 60/736
[58] Field of Search .............................. 60/39.02, 39.04, 60/39.101, 39.182, 736

[56] References Cited

U.S. PATENT DOCUMENTS

| | | |
|---|---|---|
| 3,974,642 | 8/1976 | Pacault ................................. 60/39.182 |
| 4,586,340 | 5/1986 | Kalina . |
| 4,604,867 | 8/1986 | Kalina . |
| 4,732,005 | 3/1988 | Kalina . |
| 4,932,204 | 6/1990 | Pavel et al. ............................ 60/39.02 |
| 5,095,708 | 3/1992 | Kalina . |
| 5,440,871 | 8/1995 | Dietz et al. ............................ 60/39.02 |
| 5,704,206 | 1/1998 | Kaneko et al. ........................... 60/736 |
| 5,887,418 | 8/1976 | Bruckner et al. ...................... 60/39.02 |

*Primary Examiner*—Charles G. Freay
*Attorney, Agent, or Firm*—Nixon & Vanderhye

[57] ABSTRACT

A combined cycle power generating system includes high, intermediate and low pressure vapor turbines for driving a generator or other load by expanding a multi-component fluid mixture through the turbines. A gas turbine is drivingly connected to the generator or other load. The expanded multi-component mixture exhausted from the intermediate pressure turbine flows in heat exchange relation with the fuel inlet to the combustor for the gas turbine whereby the gas turbine fuel is preheated to reduce fuel consumption of the gas turbine and increase combined cycle efficiency.

14 Claims, 3 Drawing Sheets

METHOD OF HEATING GAS TURBINE FUEL IN A COMBINED CYCLE POWER PLANT USING MULTI-COMPONENT FLOW MIXTURES

TECHNICAL FIELD

The present invention relates to methods for transforming energy from a heat source into usable form using a multi-component working fluid that is expanded and regenerated in a combined cycle power plant and particularly to afford efficiency improvements as a result of the reduction in fuel consumption and heat rate for the power plant.

BACKGROUND OF THE INVENTION

In recent years, there have been substantial improvements in thermodynamic cycles employing a multi-component working fluid and a combination of absorption, condensation, evaporation and recuperative heat exchange operations to reduce irreversible losses typical of conventional Rankine cycles. Generally, these improved thermodynamic cycles are known as Kalina cycles and afford demonstrable and substantial improvements in thermodynamic cycle efficiency. Kalina cycles use two interactive subsystems. The first subsystem involves a heat acquisition process for a multi-component working fluid comprising, for example, preheating, evaporating, reheating, regenerative feed heating and power generation. The second subsystem consists of a distillation/condensation subsystem (DCSS). The efficiency improvements of the Kalina cycle over the Rankine cycle are a result of the use of a multi-component working fluid, preferably an ammonia/water mixture, with the components having different boiling points at the same pressure. The compositions of the vapor and liquid streams change at different points throughout the cycle and the systems enable closer matching of the enthalpy-temperature characteristics of the working fluid and the heat source used to evaporate the working fluid and the heat sink used to condense it.

In the heat acquisition subsystem, the Kalina system closes the mismatch between the enthalpy-temperature characteristics of the heat source and working fluid as the working fluid passes through the boiler. These energy losses, typical of the Rankine cycle, are reduced by taking advantage of the changing temperature-enthalpy characteristics of the multi-component working fluid as it evaporates.

In the second subsystem, i.e., the DCSS of the Kalina cycle, the spent working fluid after expansion through the turbine, is too low in pressure and too high in ammonia concentration to be directly condensed at the temperature of available coolant. The working fluid therefore can only be partially condensed and a lean solution is mixed with a two-phase precondensed flow from a recuperative heat exchanger, thereby forming a lower concentration of ammonia/water mixture which can be fully condensed at available coolant temperature. The lean condensate is subsequently distilled recuperatively against the turbine exhaust to regenerate the working composition for the heat acquisition subsystem. The Kalina cycle has been the subject of a number of patents including U.S. Pat. Nos. 4,586,340; 4,604,867; 5,095,708 and 4,732,005, the disclosures of which are incorporated by reference.

A combined cycle power plant in its simplest form consists of a gas turbine, a steam turbine, a generator and a heat recovery steam generator (HRSG) with the gas turbine and steam turbine coupled to the single generator in tandem on a single shaft. Multi-shaft arrangements, having one or more gas turbine-generators and a common steam turbine generator have been utilized. The thermal efficiency of combined cycle plants is a function of the gas turbine performance in conjunction with the bottoming cycle. Kalina-type thermodynamic bottoming cycles have been studied for combined cycle application. Heat sources from the bottoming cycle are used for fuel heating in conventional Rankine bottoming cycle power plants. However, it was heretofore believed that the high efficiency of the Kalina bottoming cycle precluded further efficiency improvement via fuel heating.

SUMMARY OF THE INVENTION

The present invention provides a method for heating the fuel gas for the gas turbine in a combined cycle power plant employing a Kalina-type thermodynamic cycle to improve the overall efficiency of the power plant. This efficiency improvement is due to the reduction in fuel consumption through use of low level heat to raise the fuel sensible heat. In all three forms of the present invention, fuel heating in a Kalina bottoming cycle increases the overall efficiency of the combined cycle power plant using the Kalina-type thermodynamic cycle.

In a preferred embodiment according to the present invention, there is provided in a combined cycle power generating system having a plurality of turbines, including first and second vapor turbines, and a gas turbine for driving one or more generators for generating electricity or mechanical work, a method of increasing the efficiency of the system, comprising the steps of expanding a vapor working fluid through the first turbine, reheating expanded vapor from the first turbine, expanding the reheated vapor through the second turbine, cooling the vapor working fluid exhausted from the second turbine and heating fuel for combustion in the gas turbine by passing the fuel in heat exchange relation with a portion of the working fluid vapor exhausting from the regenerative boiler.

In a further preferred embodiment according to the present invention, there is provided in a combined cycle power generating system having a plurality of turbines including first and second turbines and a gas turbine for driving one or more generators for generating electricity or mechanical work, a method of increasing the efficiency of the system, comprising the steps of expanding through a first turbine a vapor working fluid comprised of a mixture of dissimilar components having different boiling points at identical pressure, reheating the vapor working fluid mixture from the first turbine, expanding the reheated vapor through the second turbine, heating fuel for combustion in the gas turbine by passing fuel in heat exchange relation with a portion of the working fluid mixture expanded through the second turbine and passing the working fluid, subsequent to heating the fuel, to a distillation/condensation subsystem for condensation.

Accordingly, it is a primary object of the present invention to provide a novel method of heating fuel in a Kalina combined cycle power plant employing a Kalina-type thermodynamic cycle.

DISCLOSURE OF THE INVENTION

Figure 1:
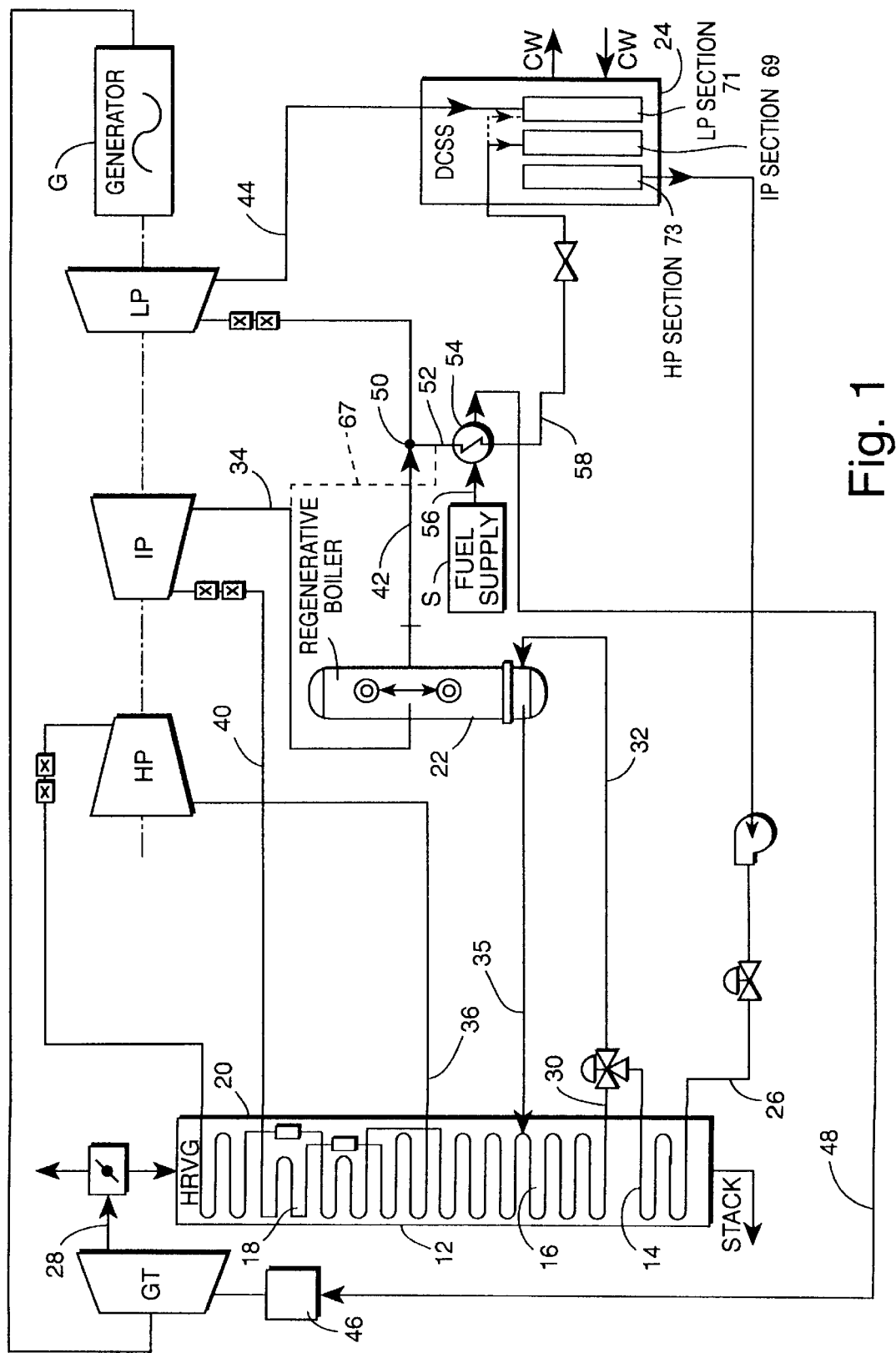
FIG. 1 is a schematic illustration of a combined cycle power plant employing a Kalina-type thermodynamic cycle illustrating a method of heating the fuel for the gas turbine according to the present invention.

Referring to FIG. 1, there is illustrated a combined cycle power plant employing a Kalina-type thermodynamic cycle comprised of a generator G, a gas turbine GT and a first high, second intermediate and third low pressure turbines HP, IP and LP, respectively, all coupled to one or more generators G for generating electrical power or, alternatively, mechanical work. The system includes a Kalina bottoming cycle, i.e., a thermodynamic cycle, which includes the HP, IP and, optionally, LP turbines, a boiler 12 including a preheater 14, an evaporator 16, a reheater 18 and a superheater 20. The system also includes a regenerative boiler 22 and a distillation/condensation subsystem 24 (DCSS). As appreciated from the foregoing reference to the Kalina cycle, a multi-component working fluid mixture is used that comprises a lower boiling point fluid and a relatively higher boiling point fluid. For example, a mixture of ammonia/ water may be used, although other mixtures will occur to those skilled in this art.

As illustrated in FIG. 1, a completely condensed working fluid passes through the preheater 14 from the DCSS 24 via line 26. Heat is supplied to the boiler 12 from the exhaust of the gas turbine as indicated by line 28, although it will be appreciated that such heat may be augmented as available from other systems. The preheated working fluid is divided into a first stream for entering the evaporator 16 via line 30 and a second stream for entering the regenerative boiler 22 via line 32. The first stream 30 in the evaporator 16 is heated by the countercurrent flow of the exhaust gases from the gas turbine. The second fluid stream flowing into the regenerative boiler 22 is heated by the exhaust stream from the intermediate pressure turbine IP via line 34 which flows in the regenerative boiler in countercurrent relation to the flow of the second stream 32. The evaporated fluid of the first and second streams is then recombined in the boiler 12, the fluid of the second stream returning from boiler 22 via line 35. The recombined stream of working fluid passes through the superheater where it is finally superheated by heat exchange with part of the gas turbine exhaust stream 28 for flow to the inlet of the high pressure turbine HP where it is expanded to convert thermal energy into mechanical energy to drive the turbine. The expanded working fluid stream from the high pressure turbine HP flows to boiler 12 via line 36 and is reheated by reheater 18 in heat exchange with the gas turbine exhaust via line 28. The reheated working fluid then flows to the inlet of the intermediate pressure turbine IP via line 40. The working fluid expanded through the intermediate pressure turbine IP passes to the regenerative boiler 22 via line 34 in heat exchange relation with the liquid working fluid stream supplied to the regenerative boiler 22 via line 32. The working fluid vapor from the IP turbine is thus cooled, providing a portion of the heat necessary for the evaporation of the working fluid in line 32. From the regenerative boiler 22, the working fluid passes via line 42 to the inlet of the low pressure turbine LP where it is expanded to a final fluid pressure level. The expanded fluid from the low pressure turbine LP passes to the distillation/condensing subsystem 24 via line 44, where the fluid stream is condensed, pumped to a higher pressure and sent to the preheater 14 via line 26 to continue the cycle.

The Kalina cycle DCSS system is used to absorb, condense and regenerate the working fluid, leaving the LP vapor turbine. A DCSS system has a minimum of two pressure levels at which the working fluid mixture of two different compositions is completely condensed, i.e., HP section 73 and LP section 71. More efficient DCSS systems have three pressure levels and mixture compositions at which complete condensation occurs, i.e., the HP section 73, IP section 69 and LP section 71, as illustrated. A DCSS mixture stream is assigned to a particular pressure section by determining the final condenser which sets the pressure of that stream (e.g., the LP condenser sets the pressure of the vapor turbine exhaust line, and, hence, the vapor turbine exhaust line is considered to be in the LP section of the DCSS). The invention described here could be applied to any DCSS system with two or more pressure level condensers.

To improve the efficiency of the combined cycle power plant described above, the fuel supplied to the combustor 46 of the gas turbine GT via line 48 is in heat exchange relation in accordance with the present invention with a split stream extracted between the regenerative boiler exhaust and the LP turbine inlet. Thus, as illustrated, the working fluid exhaust from the regenerative boiler 22 is split at 50 in part to flow via line 52 to a heat exchanger 54. The fuel for the gas turbine combustor flows into heat exchanger 54 via line 56 from a suitable supply S and the heat required to heat the fuel is provided by the latent heat of condensation available in the working fluid flowing in line 52, thus minimizing the flow rate in line 52. The heated fuel flows from the heat exchanger 54 via line 48 to the combustor 46 for the gas turbine GT. By preheating the fuel for the gas turbine GT, there is a consequent reduction in fuel consumption by the gas turbine, thus increased combined cycle efficiency. Additionally, because of the ability to extract latent heat from the working fluid in line 52 for fuel heating, the consequent loss of power in the low pressure vapor turbine is minimized. Non-isothermal condensation characteristics of the ammonia/water mixture allows the hot and cold stream temperature profiles to be virtually parallel, overcoming the pinch problem encountered in the condensation of a single component fluid. The two-phase fluid mixture exiting the heat exchanger 54 is sent to the DCSS IP or LP sections for complete condensation via line 58.

While the working fluid in heat exchange relation with the fuel is illustrated in FIG. 1 and is derived from the regenerative boiler 22, the method hereof is also applicable without a regenerative boiler. In FIG. 1, the fuel may be heated to a temperature approaching the LP turbine inlet temperature.

Figure 2:
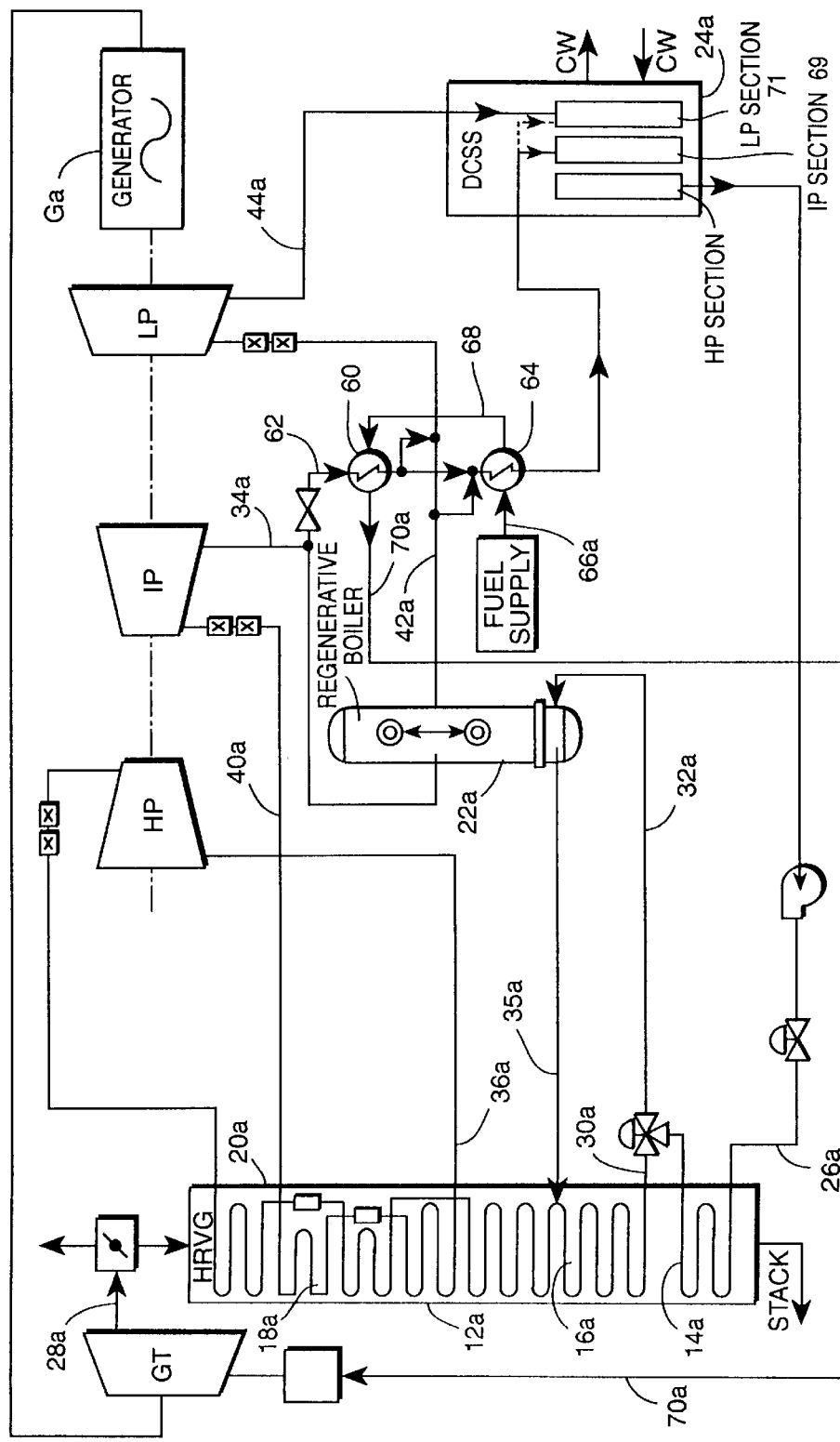
FIG. 2 is a view similar to FIG. 1 illustrating a further form of the present invention.

In FIG. 2, a similar system as in FIG. 1 is illustrated wherein like parts are referenced by like reference numerals followed by the suffix "a." In the system of FIG. 2, however, sensible heat is extracted from a portion of the expanded working fluid from the IP turbine exhaust prior to flow to the regenerative boiler. Thus, the sensible heat of a portion of the expanded fluid from the IP turbine is extracted to a heat exchanger 60 via line 62. Additionally, a heat exchanger 64 lies in heat exchange relation with fuel for the gas turbine via line 66a. As illustrated, the fuel flows via line 68 from heat exchanger 64 to the heat exchanger 60. The fuel gains additional heat as it passes in heat exchange relation with the expanded fluid from the IP turbine. The heated fuel flows from the heat exchanger 60 via line 70a to the combustor of the gas turbine. It will be appreciated that the hot stream for heating the fuel in the heat exchanger 60 may be extracted from either the intermediate pressure exhaust prior to the regenerative boiler (as illustrated in FIG. 1 by the dashed line 67) or from an intermediate point in the regenerative boiler (the regenerative boiler is a multi-shell heat exchanger). The hot stream for the heat exchanger 64 may be extracted from either the regenerative boiler outlet, from the vapor stream leaving the heat exchanger 60 or a combination of both of those streams. Similarly, as in FIG. 1, the two-phase wet mixture exiting the heat exchanger 64 is sent to the intermediate pressure section 69 or a low pressure section 71 of DCSS 24a for condensation.

Figure 3:
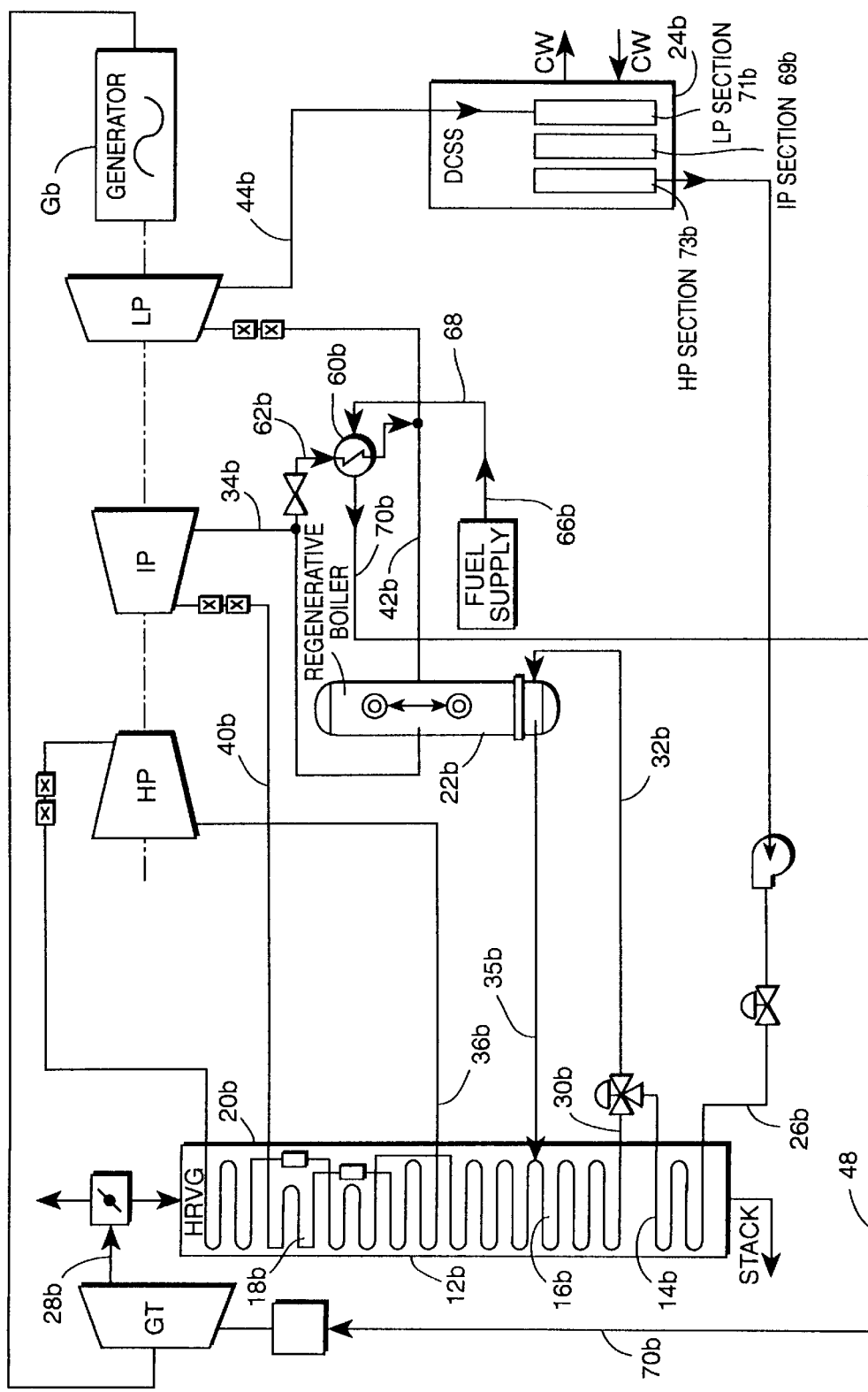
FIG. 3 is a view similar to FIG. 1 illustrating a still further form of the present invention.

Referring now to FIG. 3, a similar system as in FIGS. 1 and 2 is illustrated wherein like parts are referenced by like reference numerals, followed by the suffix "b." As illustrated, sensible heat is extracted from a portion of the expanded working fluid from the IP turbine exhaust prior to flow to the regenerative boiler 22b as in the embodiment of FIG. 2. This expanded working fluid portion is passed to the heat exchanger 60b via line 62b. The heat exchanger 60b lies in heat exchange relation with the fuel for the gas turbine via line 66b. As illustrated, the heated fuel from heat exchanger 60b passes to the combustor of the gas turbine GT via line 70b. The extracted working fluid portion passing through heat exchanger 60b rejoins the working fluid in line 42b from the regenerative boiler 22b for passing to the inlet of the low pressure turbine LP, where it is expanded to a final fluid pressure level. The exhausted working fluid from the low pressure turbine is passed through the distillation/condensation subsystem as in the prior embodiments for condensation.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a combined cycle power generating system having a plurality of turbines, including first and second vapor turbines, and a gas turbine for driving one or more generators for generating electricity or mechanical work, a method of increasing the efficiency of the system, comprising the steps of:

(a) expanding a working fluid through the first vapor turbine;

(b) reheating expanded working fluid from the first vapor turbine;

(c) expanding the reheated working fluid through the second vapor turbine;

(d) cooling the working fluid exhausted from the second vapor turbine; and (e) heating fuel for combustion in the gas turbine by passing the fuel in heat exchange relation with the working fluid expanded through said second turbine.

2. A method according to claim 1 wherein the step (e) of heating is performed subsequent to the step (d) of cooling the working fluid expanded through the second turbine.

3. A method according to claim 1 wherein the step (e) of heating is performed prior to the step (d) of cooling the working fluid expanded through the second turbine.

4. A method according to claim 1 including passing the working fluid, subsequent to step (e), to a distillation/condensation subsystem for condensation.

5. A method according to claim 4 wherein the distillation/condensation subsystem has at least two condensers operable at different pressure levels, and including the step of passing the working fluid through said two condensers.

6. A method according to claim 1 including heating the working fluid in a boiler in heat exchange relation with exhaust gases from the gas turbine, and cooling the working fluid exhausted from the second vapor turbine by passing the exhausted working fluid in heat exchange relation with a portion of the working fluid passing through said boiler.

7. A method according to claim 3 including a third turbine and including the steps of expanding the cooled working fluid through the third turbine subsequent to heating the fuel by heat exchange with the working fluid expanded through said second turbine.

8. In a combined cycle power generating system having a plurality of turbines including first and second vapor turbines and a gas turbine for driving one or more generators for generating electricity or mechanical work, a method of increasing the efficiency of the system, comprising the steps of:

expanding through a first vapor turbine a working fluid comprised of a mixture of dissimilar components having different boiling points at identical pressure;

reheating the expanded working fluid mixture from the first vapor turbine;

expanding the reheated working fluid mixture through the second vapor turbine;

heating fuel for combustion in the gas turbine by passing fuel in heat exchange relation with the working fluid mixture expanded through said second vapor turbine; and passing the working fluid, subsequent to heating the fuel, to a distillation/condensation subsystem for condensation.

9. A method according to claim 8 including a third turbine, expanding the working fluid mixture through the third turbine subsequent to passing the fuel in heat exchange relation with the working fluid mixture expanded through the second turbine.

10. A method according to claim 8 wherein the step of heating is performed subsequent to the step of cooling the working fluid expanded through the second turbine.

11. A method according to claim 8 wherein the step of heating is performed prior to the step of cooling the working fluid expanded through the second turbine.

12. A method according to claim 8 wherein the distillation/condensation subsystem has at least two condensers operable at different pressure levels, and including the step of passing the working fluid through said two condensers.

13. A method according to claim 8 including heating the working fluid in a first boiler in heat exchange relation with exhaust gases from the gas turbine, passing a first portion of the working fluid expanded through the second turbine in heat exchange relation with the fuel and passing a second portion of the working fluid expanded through the second turbine through a regenerative boiler in heat exchange relation with a portion of the working fluid passing through said first boiler.

14. A method according to claim 13 including a third vapor turbine, combining the first and second working fluid portions and expanding the combined working fluid portions through the third turbine.

\* \* \* \* \*